US012205536B2

(12) United States Patent
Wang et al.

(10) Patent No.: US 12,205,536 B2
(45) Date of Patent: Jan. 21, 2025

(54) PIXEL CIRCUIT AND DISPLAY PANEL HAVING CONTROL TERMINALS OF UNITS SHARING ONE WIRE

(71) Applicant: WUHAN CHINA STAR OPTOELECTRONICS SEMICONDUCTOR DISPLAY TECHNOLOGY CO., LTD., Wuhan (CN)

(72) Inventors: Xuanyun Wang, Wuhan (CN); Cheng Chen, Wuhan (CN); Chao Dai, Wuhan (CN); Yixian Zhang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/606,029

(22) PCT Filed: Sep. 6, 2021

(86) PCT No.: PCT/CN2021/116654

§ 371 (c)(1),
(2) Date: Mar. 2, 2023

(87) PCT Pub. No.: WO2023/024151

PCT Pub. Date: Mar. 2, 2023

(65) Prior Publication Data

US 2024/0021152 A1 Jan. 18, 2024

(30) Foreign Application Priority Data

Aug. 25, 2021 (CN) ........................ 202110981828.X

(51) Int. Cl.
*G09G 3/3225* (2016.01)

(52) U.S. Cl.
CPC ... *G09G 3/3225* (2013.01); *G09G 2300/0819* (2013.01); *G09G 2310/027* (2013.01); *G09G 2340/0457* (2013.01)

(58) Field of Classification Search
CPC .................................................... G09G 3/3225
See application file for complete search history.

(56) References Cited

U.S. PATENT DOCUMENTS 10,964,264 B1 * 3/2021 Kim ..................... G09G 3/3233
11,508,309 B2 * 11/2022 Lin ...................... G09G 3/3266

(Continued)

FOREIGN PATENT DOCUMENTS

CN 107452331 A 12/2017
CN 112735314 * 4/2021 ............... G09G 3/20

(Continued)

OTHER PUBLICATIONS

International Search Report in International application No. PCT/CN2021/116654,mailed on May 26, 2022.

(Continued)

*Primary Examiner* — William Boddie
*Assistant Examiner* — Andrew B Schnireli
(74) *Attorney, Agent, or Firm* — PV IP PC; Wei Te Chung

(57) ABSTRACT

The present disclosure discloses a pixel circuit and a display panel. The pixel circuit comprises a second wire, a first light-emitting control unit, a driving unit, and a compensation unit. A control terminal of the first light-emitting control unit and a control terminal of the compensation unit share the second wire, which can save a wire quantity of the pixel circuit, thereby improving display resolution; at the same time, a control terminal of the driving unit is only equipped with the compensation unit, which reduces a leakage path of the control terminal of the driving unit.

13 Claims, 5 Drawing Sheets

(56) References Cited

U.S. PATENT DOCUMENTS

| | | | | |
|---|---|---|---|---|
| 2016/0189603 A1* | 6/2016 | Lee | G09G 3/3266 | 345/212 |
| 2016/0322446 A1* | 11/2016 | Park | G09G 3/3233 | |
| 2019/0371238 A1* | 12/2019 | Gao | H10K 59/131 | |
| 2020/0410932 A1 | 12/2020 | Kobayashi | | |
| 2020/0410934 A1* | 12/2020 | Jeon | H10K 59/131 | |
| 2023/0133704 A1* | 5/2023 | Gai | G09G 3/3233 | 345/691 |

FOREIGN PATENT DOCUMENTS

| | | |
|---|---|---|
| CN | 113066434 A | 7/2021 |
| CN | 113096602 A | 7/2021 |
| KR | 20120002070 A | 1/2012 |

OTHER PUBLICATIONS

Written Opinion of the International Search Authority in International application No. PCT/CN2021/116654,mailed on May 26, 2022.

* cited by examiner

PIXEL CIRCUIT AND DISPLAY PANEL HAVING CONTROL TERMINALS OF UNITS SHARING ONE WIRE

RELATED APPLICATIONS

This application is a Notional Phase of PCT Patent Application No. PCT/CN2021/116654 having international filing date of Sep. 6, 2021, which claims the benefit of priority of Chinese Patent Application No. 202110981828.X filed on Aug. 25, 2021. The contents of the above applications are all incorporated by reference as if fully set forth herein in their entirety.

BACKGROUND OF DISCLOSURE

Field of Disclosure

The present disclosure relates to a field of display technology, and in particular to a pixel circuit and a display panel.

Description of Prior Art

In a pixel circuit of a traditional technical solution, most of each transistor needs to be equipped with at least one wire as a control signal line and/or an input signal line, which requires more signal lines to be used, resulting in an increasing area of each pixel, which is not conducive to improving display resolution.

It should be noted that above introduction of background technology is only to facilitate a clear and complete understanding of technical solutions of the present disclosure. Therefore, it should not be considered that the above-mentioned technical solutions involved are known to those skilled in the art merely since the technical solutions appear in the background art of the present disclosure.

SUMMARY OF DISCLOSURE

The present disclosure provides a pixel circuit and a display panel to alleviate a technical problem that a pixel circuit needs to use more wires.

In one aspect, the present disclosure provides a pixel circuit comprising: a second wire; a first light-emitting control unit, wherein a control terminal of the first light-emitting control unit is electrically connected to the second wire; a driving unit, wherein one terminal of the driving unit is electrically connected to one terminal of the first light-emitting control unit; and a compensation unit, wherein one terminal of the compensation unit is electrically connected to the driving unit, another terminal of the compensation unit is electrically connected to a control terminal of the driving unit, and a control terminal of the compensation unit is electrically connected to the second wire.

In some embodiments, a switching element used in the compensation unit is an N-channel type oxide thin film transistor; and a switching element used in the first light-emitting control unit is a P-channel type thin film transistor.

In some embodiments, the switching element used in the first light-emitting control unit is a polysilicon thin film transistor; and a switching element used in the driving unit is a polysilicon thin film transistor.

In some embodiments, the pixel circuit further comprises: a first wire; a third wire; a fourth wire; a fifth wire; a second light-emitting control unit, wherein one terminal of the second light-emitting control unit is electrically connected to the first wire, another terminal of the second light-emitting control unit is electrically connected to another terminal of the driving unit, and a control terminal of the second light-emitting control unit is electrically connected to the third wire; and an initialization unit, wherein one terminal of the initialization unit is electrically connected to the fourth wire, a control terminal of the initialization unit is electrically connected to the fifth wire, and another terminal of the initialization unit is electrically connected to any one of one terminal of the first light-emitting control unit, another terminal of the first light-emitting control unit, or the control terminal of the driving unit; wherein, in an initialization phase of the pixel circuit, at least one of the compensation unit, the first light-emitting control unit, and or the initialization unit is in an on state.

In some embodiments, the pixel circuit further comprises: a first wire, wherein the first wire is electrically connected to another terminal of the first light-emitting control unit; a third wire; a fourth wire; a fifth wire; a second light-emitting control unit, wherein one terminal of the second light-emitting control unit is electrically connected to another terminal of the driving unit, and a control terminal of the second light-emitting control unit is electrically connected to the third wire; and an initialization unit, wherein one terminal of the initialization unit is electrically connected to the fourth wire, a control terminal of the initialization unit is electrically connected to the fifth wire, and another terminal of the initialization unit is electrically connected to any one of one terminal of the second light-emitting control unit, another terminal of the second light-emitting control unit, or the control terminal of the driving unit; wherein, in an initialization phase of the pixel circuit, the compensation unit, the second light-emitting control unit, and the initialization unit are all in an on state simultaneously.

In some embodiments, the third wire is configured to transmit a gray-scale modulation signal; a light-emitting phase of the pixel circuit comprises a plurality of light-emitting sub-phases, and effective light-emitting phases of at least two of the light-emitting sub-phases are different.

In some embodiments, the effective light-emitting times in the plurality of light-emitting sub-phases are sequentially increased or sequentially decreased.

In some embodiments, the pixel circuit further comprises: a sixth wire; a seventh wire; an eighth wire; a light-emitting unit, wherein one terminal of the light-emitting unit is electrically connected to the another terminal of the first light-emitting control unit or the another terminal of the second light-emitting control unit, and another terminal of the light-emitting unit is electrically connected to the sixth wire; and a writing unit, wherein one terminal of the writing unit is electrically connected to the seventh wire, a control terminal of the writing unit is electrically connected to the eighth wire, and another terminal of the writing unit is electrically connected to the driving unit.

In a second aspect, the present disclosure provides a pixel circuit, comprising: a second wire; a first light-emitting control transistor, wherein a gate of the first light-emitting control transistor is electrically connected to the second wire; a driving transistor, wherein one of a source or a drain of the driving transistor is electrically connected to one of a source or a drain of the first light-emitting control transistor; and a compensation transistor, one of a source or a drain of the compensation transistor is electrically connected to the driving transistor, and another one of the source or the drain of the compensation transistor is electrically connected to a gate of the driving transistor, and a gate of the compensation transistor is electrically connected to the second wire.

In some embodiments, the compensation transistor is an N-channel type oxide thin film transistor; and the first light-emitting control transistor is a P-channel type thin film transistor.

In some embodiments, the first light-emitting control transistor is a polysilicon thin film transistor; and the driving transistor is a polysilicon thin film transistor.

In some embodiments, the pixel circuit further comprises: a first wire; a third wire; a fourth wire; a fifth wire; a second light-emitting control transistor, wherein one of a source or a drain of the second light-emitting control transistor is electrically connected to the first wire, and another one of the source or the drain of the second light-emitting control transistor is electrically connected to another one of the source or the drain of the driving transistor, and a gate of the second light-emitting control transistor is electrically connected to the third wire; and an initialization transistor, wherein one of a source or a drain of the initialization transistor is electrically connected to the fourth wire, a gate of the initialization transistor is electrically connected to the fifth wire, and another one of the source or the drain of the initialization transistor is electrically connected to any one of one of the source or the drain of the first light-emitting control transistor, another one of the source or the drain of the first light-emitting control transistor, or the gate of the driving transistor; wherein, in an initialization phase of the pixel circuit, at least one of the compensation transistor, the second light-emitting control transistor, or the initialization transistor is in an on state.

In some embodiments, wherein the pixel circuit further comprises: a first wire, wherein the first wire is electrically connected to another one of the source or the drain of the first light-emitting control transistor; a third wire; a fourth wire; a fifth wire; a second light-emitting control transistor, one of a source or a drain of the second light-emitting control transistor is electrically connected to another one of the source or the drain of the driving transistor, and a gate of the second light-emitting control transistor is electrically connected to the third wire; and an initialization transistor, one of a source or a drain of the initialization transistor is electrically connected to the fourth wire, a gate of the initialization transistor is electrically connected to the fifth wire, and another one of the source or the drain of the initialization transistor is electrically connected to any one of one of the source or the drain of the second light-emitting control transistor, another one of the source or the drain of the second light-emitting control transistor, or the gate of the driving transistor; wherein, in an initialization phase of the pixel circuit, the compensation transistor, the second light-emitting control transistor, and the initialization transistor are simultaneously in an on state.

In some embodiments, the third wire is configured to transmit a gray-scale modulation signal; a light-emitting phase of the pixel circuit comprises a plurality of light-emitting sub-phases, and in the plurality of light-emitting sub-phases, an effective level duration of the gray-scale modulation signal changes sequentially.

In some embodiments, the pixel circuit further comprises: a sixth wire; a seventh wire; an eighth wire; a light-emitting device, an anode of the light-emitting device is electrically connected to another one of the source or the drain of the first light-emitting control transistor or another one of the source or the drain of the second light-emitting control transistor, and a cathode of the light-emitting device is electrically connected to the sixth wire; and a writing transistor, one of a source or a drain of the writing transistor is electrically connected to the seventh wire, a gate of the writing transistor is electrically connected to the eighth wire, and another one of the source or the drain of the writing transistor is electrically connected to one of the source or the drain of the driving transistor.

In a third aspect of the present disclosure, the present disclosure provides a display panel comprising the pixel circuit of any one of the above embodiments.

In the pixel circuit provided in the present disclosure, the control terminal of the first light-emitting control unit and the control terminal of the compensation unit share the second wire, which can save wire quantity of the pixel circuit, thereby improving display resolution. At the same time, the control terminal of the driving unit is only equipped with the compensation unit, which reduces leakage path of the control terminal of the driving unit, and can reduce leakage current of the control terminal of the driving unit.

DETAILED DESCRIPTION OF EMBODIMENTS

In order to make purpose, technical solutions, and effects of the present disclosure clear, the following further describes the present disclosure in detail with reference to the accompanying drawings and embodiments. It should be understood that the specific embodiments described here are only used to explain the present disclosure, and are not used to limit the present disclosure.

Figure 1:
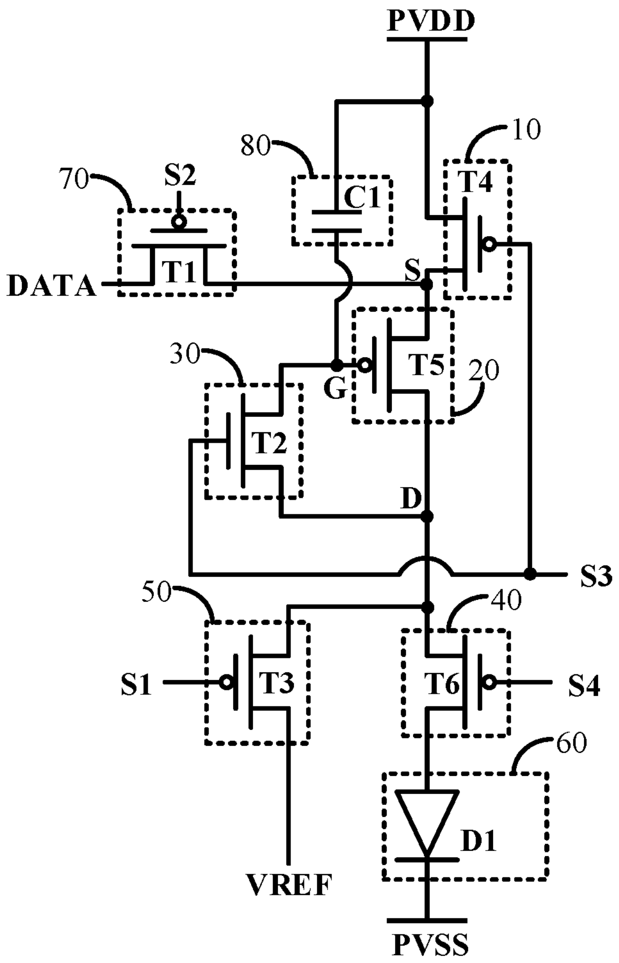
FIG. 1 is a schematic structural diagram of a pixel circuit provided by an embodiment of the present disclosure.

Please refer to FIGS. 1-9. As shown in FIG. 1, this embodiment provides a pixel circuit, which comprises a second wire, a first light-emitting control unit 10, a driving unit 20, and a compensation unit 30. A control terminal of the first light-emitting control unit 10 is electrically connected to the second wire; one terminal of the driving unit 20 is electrically connected to one terminal of the first light-emitting control unit 10; one terminal of the compensation unit 30 is electrically connected to the driving unit 20, another terminal of the compensation unit 30 is electrically connected to a control terminal of the driving unit 20, and a control terminal of the compensation unit 30 is electrically connected to the second wire.

It can be understood that, in the pixel circuit provided in this embodiment, the control terminal of the first light-emitting control unit 10 and the control terminal of the compensation unit 30 share the second wire, which can save a number of wires of the pixel circuit, thereby improving display resolution. At the same time, the control terminal of the driving unit 20 is only equipped with the compensation unit 30, which reduces a leakage path of the control terminal of the driving unit 20, and can reduce leakage current of the control terminal of the driving unit 20.

It should be noted that a first wire may be used to transmit a constant voltage high potential signal PVDD. The second wire may be used to transmit a first light-emitting control signal S3.

In one of the embodiments, the first light-emitting control unit 10 may comprise one of a first light-emitting control transistor T4 or a second light-emitting control transistor T6.

In one of the embodiments, the driving unit 20 may comprise a driving transistor T5.

In one of the embodiments, the compensation unit 30 may comprise a compensation transistor T2.

In one of the embodiments, one of a source or a drain of the first light-emitting control transistor T4 is electrically connected to the first wire, and a gate of the first light-emitting control transistor T4 is electrically connected to the second wire; one of a source or a drain of the driving transistor T5 is electrically connected to another one of the source or the drain of the first light-emitting control transistor T4; one of a source or a drain of the compensation transistor T2 is electrically connected to another one of the source or the drain of the driving transistor T5, another one of the source or the drain of the compensation transistor T2 is electrically connected to a gate of the driving transistor T5, and a gate of the compensation transistor T2 is electrically connected to the second wire.

It can be understood that, in the pixel circuit provided in this embodiment, the gate of the first light-emitting control transistor T4 and the gate of the compensation transistor T2 share the second wire, which can save the wire quantity of the pixel circuit, thereby improving the display resolution. At the same time, the gate of the driving transistor T5 is only equipped with the compensation transistor T2, which reduces a leakage path of the gate of the driving transistor T5 and can reduce leakage current of the gate of the driving transistor T5.

In one of the embodiments, a switching element used in the compensation unit 30 is an N-channel oxide thin film transistor. It can be understood that the leakage current of the gate of the driving transistor T5 can be further reduced. A switching element used in the first light-emitting control unit 10 is a P-channel thin film transistor, so that the compensation unit 30 and the first light-emitting control unit will not be turned on or turned off at the same time, that is, when the compensation unit 30 is turned on, the first light-emitting control unit 10 is turned off; or when the compensation unit 30 is turned off, the first light-emitting control unit 10 is turned on.

In one of the embodiments, a switching element used in the first light-emitting control unit 10 is a polysilicon thin film transistor; and a switching element used in the driving unit 20 is a polysilicon thin film transistor. It can be understood that this embodiment can improve dynamic performance of the pixel circuit.

In one of the embodiments, the pixel circuit further comprises the first wire, a third wire, a fourth wire, a fifth wire, a second light-emitting control unit and an initialization unit 50. The first wire is electrically connected to another terminal of the first light-emitting control unit 10; one terminal of the second light-emitting control unit 40 is electrically connected to another terminal of the driving unit and a control terminal of the second light-emitting control unit 40 is electrically connected to the third wire; one terminal of the initialization unit 50 is electrically connected to the fourth wire, a control terminal of the initialization unit 50 is electrically connected to the fifth wire, and another terminal of the initialization unit 50 is electrically connected to any one of one terminal of the second light-emitting control unit 40, another terminal of the second light-emitting control unit, or the control terminal of the driving unit; wherein, in an initialization phase of the pixel circuit, the compensation unit 30, the second light-emitting control unit 40, and the initialization unit 50 are simultaneously in an on state.

It can be understood that, in this embodiment, the compensation unit 30, the second light-emitting control unit 40, and the initialization unit 50 are simultaneously in the on state, and a potential of an anode of a light-emitting unit 60 and a potential of the control terminal of the driving unit 20 can be reset at the same time. Wherein, the compensation unit 30 and the second light-emitting control unit 40 can achieve a multiplexing effect, which reduces a hardware structure required by the pixel circuit.

In one of the embodiments, the second light-emitting control unit may comprise another one of the first light-emitting control transistor T4 or the second light-emitting control transistor T6.

In one of the embodiments, the initialization unit 50 may comprise an initialization transistor T3.

In one of the embodiments, one of a source or a drain of the second light-emitting control transistor T6 is electrically connected to another one of the source or the drain of the driving transistor T5, and a gate of the second light-emitting control transistor T6 is electrically connected to the third wire; one of a source or a drain of the initialization transistor T3 is electrically connected to the fourth wire, a gate of the initialization transistor T3 is electrically connected to the fifth wire, and another one of the source or the drain of the initialization transistor T3 is electrically connected to any one of one of the source and drain of the second light-emitting control transistor T6, another one of the source or the drain of the second light-emitting control transistor T6, and the gate of the driving transistor T5. Wherein, in an initialization phase of the pixel circuit, the compensation transistor T2, the second light-emitting control transistor T6, and the initialization transistor T3 are simultaneously in the on state.

In one of the embodiments, the third wire is used to transmit a gray-scale modulation signal S4 or a second light-emitting control signal; a light-emitting phase of the pixel circuit comprises a plurality of light-emitting sub-phases, and effective light-emitting times in at least two light-emitting sub-phases are different.

In one of the embodiments, the effective light-emitting times in the plurality of light-emitting sub-phases are sequentially increased or sequentially decreased.

In one of the embodiments, the effective light-emitting times in the plurality of light-emitting sub-phases may also be same.

In one of the embodiments, the third wire is used to transmit the gray-scale modulation signal S4; one light-emitting phase of the pixel circuit comprises the plurality of light-emitting sub-phases. During the plurality of light-emitting sub-phases, effective potential durations of the gray-scale modulation signal S4 change in turn.

It should be noted that the fourth wire may be used to transmit a reference voltage signal VREF. The fifth wire may be used to transmit an initialization control signal S1.

In one of the embodiments, the pixel circuit further comprises a sixth wire, a seventh wire, an eighth wire, a light-emitting unit 60, and a writing unit One terminal of the light-emitting unit 60 is electrically connected to another terminal of the first light-emitting control unit 10 or another terminal of the second light-emitting control unit 40, and another terminal of the light-emitting unit 60 is electrically connected to the sixth wire; one terminal of the writing unit 70 is electrically connected to the seventh wire, and a control terminal of the writing unit 70 is electrically connected to the eighth wire, and another terminal of the writing unit 70 is electrically connected to the driving unit 20.

It should be noted that the sixth wire may be used to transmit a constant voltage low potential signal PVSS. The seventh wire may be used to transmit a data signal DATA. The eighth wire may be used to transmit a writing control signal S2.

In one of the embodiments, the light-emitting unit 60 may comprise a light-emitting device DE The light-emitting device D1 may be, but is not limited to, an organic light-emitting diode (OLED), a micro-light-emitting diode (Micro-LED), or a Mini-LED.

In one of the embodiments, the writing unit 70 may comprise a writing transistor T1.

In one of the embodiments, an anode of the light-emitting device D1 is electrically connected to another one of the source or the drain of the first light-emitting control transistor T4 or another one of the source or the drain of the second light-emitting control transistor T6, a cathode of the light-emitting device D1 is electrically connected to the sixth wire; one of a source or a drain of the writing transistor T1 is electrically connected to the seventh wire, and a gate of the writing transistor T1 is electrically connected to the eighth wire, and another one of the source or the drain of the writing transistor T1 is electrically connected to one of the source or the drain of the driving transistor T5.

In one of the embodiments, the compensation transistor T2 may be, but is not limited to, an N-channel type oxide thin film transistor, and specifically may also be an N-channel type metal oxide thin film transistor. At least one of the first light-emitting control transistor T4, the second light-emitting control transistor T6, the driving transistor T5, the initialization transistor T3, the compensation transistor T2, or the writing transistor T1 may be, but is not limited to, the P-channel thin film transistor, and specifically may also be the polysilicon thin film transistor or the oxide thin film transistors, and specifically a low temperature polysilicon thin film transistor or a metal oxide thin film transistor. At least one of the first light-emitting control transistor T4, the second light-emitting control transistor T6, the driving transistor T5, the initialization transistor T3, the compensation transistor T2, or the writing transistor T1 may also be an N-channel thin film transistor, and specifically may be the polysilicon thin film transistor or the oxide thin film transistor, and specifically may also be the low temperature polysilicon thin film transistor or the metal oxide thin film transistor.

In one of the embodiments, the pixel circuit may further comprise a storage unit 80, one terminal of the storage unit 80 is electrically connected to the control terminal of the driving unit 20, and another terminal of the storage unit 80 is electrically connected to the first wire.

In one of the embodiments, the storage unit 80 comprises a storage capacitor C1, one terminal of the storage capacitor C1 is electrically connected to the gate of the driving transistor T5, and another terminal of the storage capacitor C1 is electrically connected to the first wire.

Figure 2:
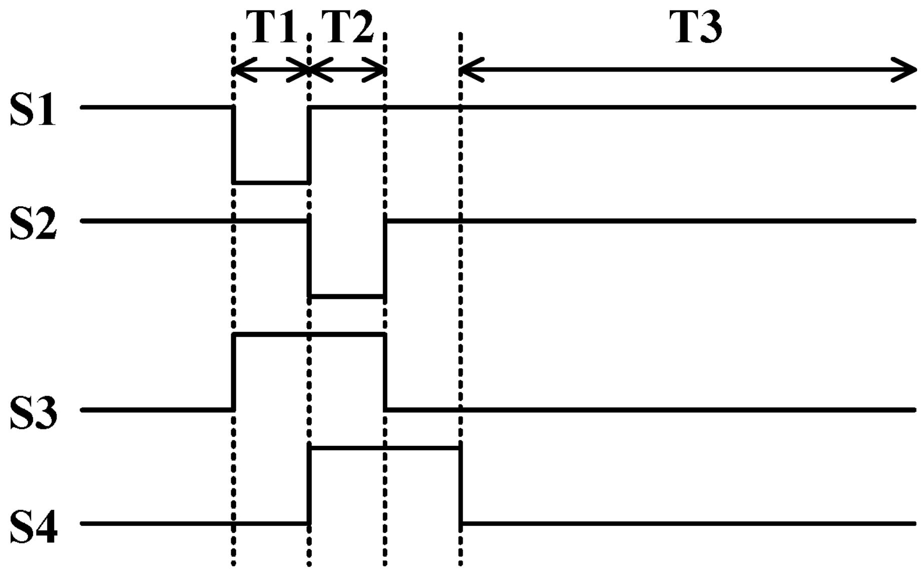
FIG. 2 is a timing diagram of the pixel circuit in FIG. 1.

As shown in FIG. 2, an operating phase of the pixel circuit in the foregoing embodiment may comprise following phases:

Initialization phase T1: the initialization control signal S1 and the gray-scale modulation signal S4 are both at low potentials, and the writing control signal S2 and the first light-emitting control signal S3 are both at high potentials. The compensation transistor T2, the initialization transistor T3, and the second light-emitting control transistor T6 are all in the on state, and the writing transistor T1 and the first light-emitting control transistor T4 are all in an off state. The gate of the driving transistor T5 is reset to a potential of the reference voltage signal VREF through the compensation transistor T2 and the initialization transistor T3; at the same time, the anode of the light-emitting device D1 is reset to the potential of the reference voltage signal VREF through the initialization transistor T3 and the second light-emitting control transistor T6.

Writing phase (and threshold voltage Vth extraction phase) T2: the writing control signal S2 is at a low potential, and the initialization control signal S1, the first light-emitting control signal S3, and the gray-scale modulation signal S4 are all at high potentials. The writing transistor T1 and the compensation transistor T2 are both kept in the on state, and the first light-emitting control transistor T4 and the second light-emitting control transistor T6 are both in the off state. The source of the driving transistor T5 is charged to a potential VDATA of the data signal through the writing transistor T1; the gate of the driving transistor T5 is charged to a potential of VDATA−|Vth| through the writing transistor T1, the driving transistor T5, and the compensation transistor T2. The potential VDATA of the data signal and a threshold voltage Vth of the driving transistor T5 are both stored on a low electrode, that is, a node G, of the storage capacitor C1.

Light-emitting phase T3: the first light-emitting control signal S3 and the gray-scale modulation signal S4 are both at low potentials, and the initialization control signal S1 and the writing control signal S2 are both at high potentials. The first light-emitting control transistor T4 and the second light-emitting control transistor T6 are both in the on state, and the writing transistor T1, the compensation transistor T2, and the initialization transistor T3 are all in the off state. A voltage of the source of the driving transistor T5 is a potential of the constant voltage high-potential signal PVDD, a voltage of the gate of the driving transistor T5 is VDATA−|Vth|, and the driving transistor T5 works in a saturation region, so that a current IDLED flowing through the driving transistor T5 is:

$$\text{IOLED}=\mu CW[\text{VPVDD}-(\text{VDATA}-|Vth|)-|Vth|]^2/2L$$

$$\text{IOLED}=\mu CW[\text{VPVDD}-\text{VDATA}]^2/2L$$

Wherein, μ, C, W, and L are a mobility of the driving transistor T5, a gate dielectric capacitance per unit area, a channel width, and a channel length, respectively, VPVDD is the potential of the constant voltage high potential signal PVDD, and VDATA is a potential of the data signal DATA. According to the above formula, it can be known that after the pixel circuit provided by the present disclosure enters the light-emitting phase, the current IDLED flowing through the driving transistor T5 is independent of the threshold voltage Vth of the driving transistor T5.

The reference voltage signal VREF is used to initialize or reset a potential of the gate of the driving unit 20 and a potential of one terminal of the storage unit 80, and is also used to initialize or reset a potential of the anode of the light-emitting unit 60 to form a reverse bias or zero bias, which forms two conditions of opposite bias polarities with a forward bias of the light-emitting unit 60 in the light-emitting phase T3, which is beneficial to alleviate aging of the light-emitting device D1; and the light-emitting device D1 does not emit light in the initialization phase T1 and transitions from a black frame to a next frame of color display, which helps to eliminate an afterimage delay.

Wherein, the initialization control signal S1 and the writing control signal S2 are both of a same type of level transfer signal or row driving signal, that is, an output level of the writing control signal S2 in current clock cycle is same as an output level of the initialization signal S1 in a previous adjacent clock cycle, which can be expressed in a pixel array of the display panel as: a row driving signal required by an i-th row of pixels, that is, the initialization control signal S1, can be S(i)1, another row driving signal required by the i-th row of pixels, that is, the writing control signal S2, can be S(i)2; a row driving signal required by an (i+1)-th row of pixels, that is, the initialization control signal S1, can be S(i+1)1, and another row driving signal required by the (i+1)-th row of pixels, that is, the writing control signal S2, can be S(i+1)2, so that S(i)2 and S(i+1)1 can be driven by a same driving signal. The first light-emitting control signal S3 and the gray-scale modulation signal S4 are also row driving signals with an above-mentioned level transfer relationship type. A low temperature poly-silicon (LTPS) thin film transistor (TFT) can be a P-type field effect transistor, that is, when a potential of the gate is lower than a potential of the source by a threshold voltage, it is in the on state, a resistance between the drain and the source is greatly reduced, and a large current flows; when the potential of the gate is not lower than the potential of the source by a threshold voltage, it is in the off state, the resistance between the drain and the source is very high, and a small current flows.

The metal oxide semiconductor is represented by an amorphous oxide thin film transistor or an amorphous indium gallium zinc oxide thin film transistor, which is an N-type field effect transistor, that is, when a potential of a gate is higher than a potential of a source by a threshold voltage, it is in the on state, a resistance between the drain and the source is greatly reduced, and a large current flows; when the potential of the gate is not higher than the potential of the source by a threshold voltage, it is in the off state, the resistance between the drain and the source is very large, and a small current flows. Since the compensation transistor T2 and the first light-emitting control transistor T4 are N-type and P-type transistors, respectively, the two are complementary devices and are controlled by a same first light-emitting control signal S3. Therefore, only one of the compensation transistor T2 and the first light-emitting control transistor T4 is turned on, and another one is turned off under any operating conditions.

The compensation transistor T2 is an oxide thin film transistor, which is mainly responsible for completing extraction of the threshold voltage of the driving transistor T5 in accordance with a control timing in a non-luminous writing phase, and storing the threshold voltage in the storage capacitor C1. The storage capacitor C1 is mainly responsible for storing a level required for a normal operation of a voltage holding circuit. The light-emitting unit 60 may be an active electroluminescent device.

A working principle of the above-mentioned pixel circuit may comprise an analog voltage driving type operating process and a digital pulse width modulation (PWM) driving type operating process.

The analog voltage driving type operating process: in the initialization phase, the reference voltage signal VREF is transmitted to the gate of the driving transistor T5, one terminal of the storage capacitor C1, and the anode of the light-emitting device D1 through the compensation transistor T2, the initialization transistor T3, and the second light-emitting control transistor T6. Levels of above-mentioned nodes are initialized, and a reset is completed, so that the light-emitting device D1 is extinguished, and contrast is increased, which can prepare for extraction and compensation of the threshold voltage and writing of the data voltage in a next phase. In a threshold voltage compensation and data voltage writing phase, the data voltage containing analog display information is transmitted to the source S of the driving transistor T5 through the writing transistor T1, the compensation transistor T2 and the driving transistor T5 form a diode connection form, which can extract the threshold voltage of the driving transistor T5, and the threshold voltage is stored in a plate of the storage capacitor C1. At current phase, the extraction of the threshold voltage and programming of the analog data voltage are completed at the same time. During the light-emitting phase, the driving transistor T5 drives a current to flow through the light-emitting device D1 according to a previous threshold voltage compensation and a gate-source voltage written by the data voltage.

Digital pulse width modulation driving type operating process: a process of a low gray-scale voltage programming phase is same with the initialization phase of the analog voltage driving type operating process and the threshold voltage compensation and data voltage writing phase, the initialization, the threshold voltage extraction, and the storage of the data voltage of a low grayscale current are completed through the above two processes. The pulse width modulation phase is the light-emitting phase of the pixel circuit, which is different from the analog voltage driving type operating process where a high current continues to emit light at this phase. The gray-scale modulation signal S4 outputs pulse signals of different or same pulse widths to control the light-emitting device D1 to extinguish or to emit light with a small current. At this phase, the light-emitting device D1 does not continuously emit light. The effective light-emitting time of the light-emitting device D1 is controlled by the gray-scale modulation signal S4 with a same frequency and an adjustable duty cycle. Power consumed by the light-emitting device D1 during an incomplete light-emitting time can be equivalent to the light emitted by the light-emitting device D1 at a lower power consumption corresponding to the duty cycle during an entire light-emitting time, which is difficult for people to feel a flicker due to a visual persistence effect of human eyes, so as to achieve a low grayscale brightness display.

It is worth mentioning that the early OLED process technology is not advanced enough, and a driving current of the pixel circuit can reach a μA level. Therefore, the analog voltage driving operating process can achieve a more precise control of the light-emitting current. With advancement of OLED technology, the light-emitting efficiency continues to increase, so that the light-emitting current of the OLED can be reduced to an nA level. If an analog voltage is used for driving, the driving transistor T5 can only be driven at a low current if it is biased in a sub-threshold region. For the sub-threshold region, an output current of the driving transistor T5 is extremely sensitive to changes in the gate voltage. A slight difference in performance of the driving transistor T5 and the OLED will result in a huge difference in display brightness. A digital dimming of the present disclosure is very critical for accurately modulating a micro current of the OLED, which can be compatible with high/low frame rate driving and flexible modulation.

Figure 3:
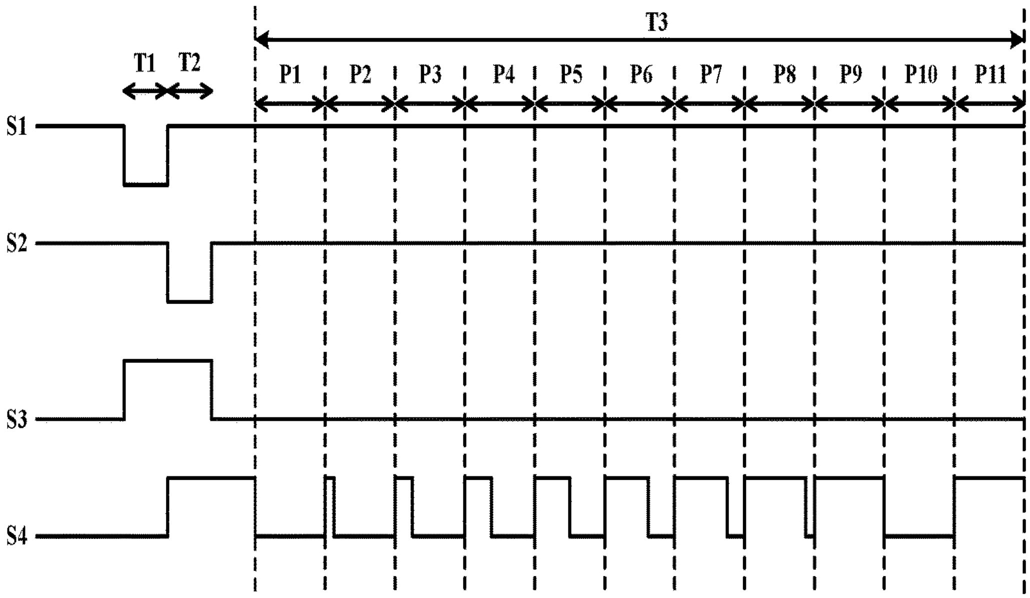
FIG. 3 is a timing diagram of the pixel circuit in FIG. 1 operating in a pulse width modulation phase.

As shown in FIG. 3, in the light-emitting phase T3, a plurality of light-emitting sub-phases P1 to P11 with different display gray scales can be set. For the light-emitting sub-phase P1, since the gray-scale modulation signal S4 is at a low level, the second thin film transistor remains on, and a corresponding light-emitting current is IOLED. For the light-emitting sub-phase P2, a ratio of a low-level time of the gray-scale modulation signal S4 to a total time of the light-emitting sub-phase P2 may be (n−1)/n, so an average current value of the light-emitting sub-phase P2 is reduced in proportion to IOLED*(n−1)/n, that is, average light-emitting brightness of the light-emitting sub-phase P2 is equivalently reduced to (n−1)/n of average light-emitting brightness of the light-emitting sub-phase P1. In subsequent light-emitting sub-phase P3 to the light-emitting sub-phase P11, as a low-level duration of the gray-scale modulation signal S4 decreases, correspondingly, an average current value flowing through the OLED decreases proportionally, so by adjusting a low-level pulse width duty cycle, an effect of adjusting brightness of light is achieved.

Figure 4:
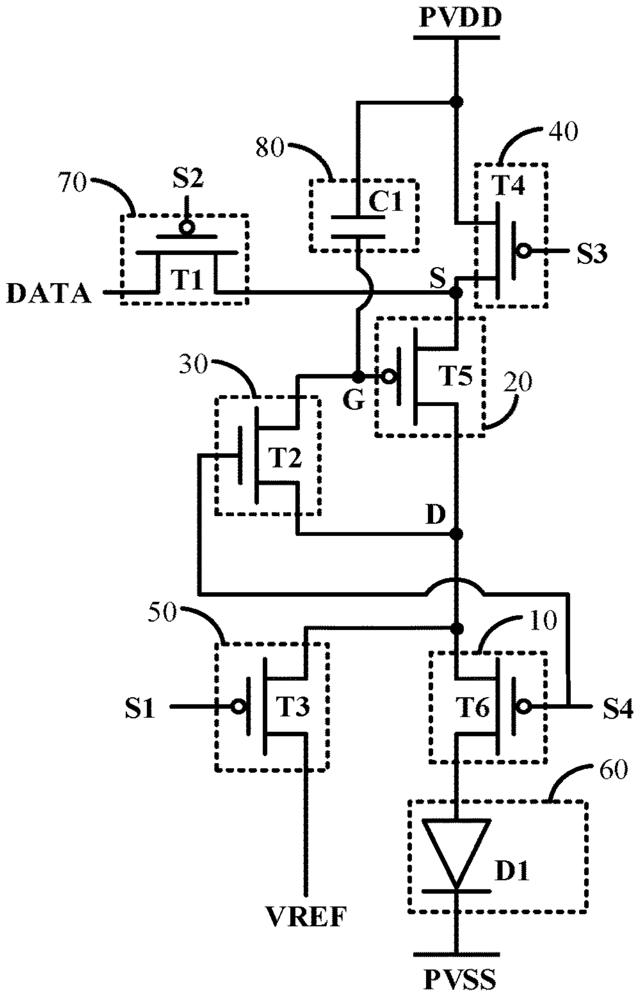
FIG. 4 is another schematic structural diagram of a pixel circuit provided by an embodiment of the present disclosure.

As shown in FIG. 4, in one of the embodiments, the control terminal of the first light-emitting control unit 10 is electrically connected to the second wire; one terminal of the driving unit 20 is electrically connected to one terminal of the first light-emitting control unit 10; and one terminal of the compensation unit 30 is electrically connected to the driving unit 20, another terminal of the compensation unit 30 is electrically connected to the control terminal of the driving unit 20, and the control terminal of the compensation unit 30 is electrically connected to the second wire.

The pixel circuit shown in FIG. 4 further comprises the first wire, the third wire, the fourth wire, the fifth wire, the second light-emitting control unit 40, and the initialization unit 50. One terminal of the second light-emitting control unit 40 is electrically connected to the first wire, another terminal of the second light-emitting control unit 40 is electrically connected to another terminal of the driving unit 20, the control terminal of the second light-emitting control unit 40 is electrically connected to the third wire; one terminal of the initialization unit 50 is electrically connected to the fourth wire, the control terminal of the initialization unit 50 is electrically connected to the fifth wire, and another terminal of the initialization unit 50 is connected to any one of one terminal of the first light-emitting control unit 10, another terminal of the first light-emitting control unit 10, or the control terminal of the driving unit 20. Wherein, in the initialization phase of the pixel circuit, at least one of the compensation unit, the first light-emitting control unit 10, or the initialization unit 50 is in the on state.

Wherein, the first light-emitting control unit 10 may comprise the first light-emitting control transistor T6. The second light-emitting control unit 40 may comprise the second light-emitting control transistor T4. The first light-emitting control unit 10 is electrically connected between the second light-emitting control unit 40 and the light-emitting unit 60.

In one of the embodiments, the pixel circuit further comprises the first wire, the third wire, the fourth wire, the fifth wire, the second light-emitting control transistor T4, and the initialization transistor T3, and one of the source or the drain of the second light-emitting control transistor T4 is electrically connected to the first wire, another one of the source or the drain of the second light-emitting control transistor T4 is electrically connected to another one of the source or the drain of the driving transistor T5, and the gate of the second light-emitting control transistor T4 is electrically connected to the third wire; one of the source or the drain of the initialization transistor T3 is electrically connected to the fourth wire, the gate of the initialization transistor T3 is electrically connected to the fifth wire, and another one of the source or the drain of the initialization transistor T3 is electrically connected to any one of one of the source or the drain of the first light-emitting control transistor T6, another one of the source or the drain of the first light-emitting control transistor T6, or the gate of the driving transistor T5. Wherein, in the initialization phase of the pixel circuit, at least one of the compensation transistor T2, the second light-emitting control transistor T4, or the initialization transistor T3 is in the on state.

Figure 5:
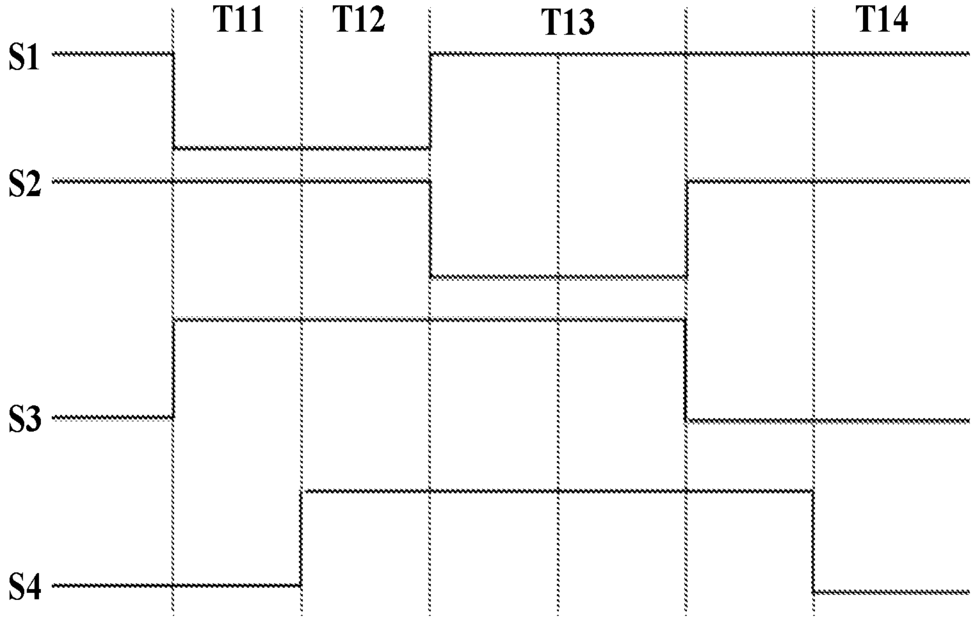
FIG. 5 is a timing diagram of the pixel circuit in FIG. 4.

As shown in FIG. 5, the operating process of the pixel circuit shown in FIG. 4 comprises the following phases:

A first phase T11: the initialization control signal S1 is at a low potential, the first light-emitting control signal S4 is at a low potential, the initialization transistor T3 and the first light-emitting control transistor T6 are in the on state, and the anode of the light-emitting device D1 is reset.

A second phase T12: the initialization control signal S1 is at a low potential, the first light-emitting control signal S4 is at a high potential, the first light-emitting control transistor T6 is turned off, the initialization transistor T3 and the compensation transistor T2 are turned on, and the gate of the driving transistor T5 is reset.

A third phase T13: the writing control signal S2 is at a low potential, the first light-emitting control signal S4 is at a high potential, and the data signal DATA sequentially passes through the driving transistor T5 and the compensation transistor T2 to the storage capacitor C1 to compensate the threshold voltage Vth of the driving transistor T5 and the writing the data signal DATA.

A fourth phase T14: the gray-scale modulation signal S3 and the first light-emitting control signal S4 are both at low potentials, and the light-emitting device D1 emits light.

Wherein, in the embodiments shown in FIGS. 4 and 5, the second wire may be used to transmit the first light-emitting control signal S4, and the third wire may be used to transmit the gray-scale modulation signal S3.

Figure 6:
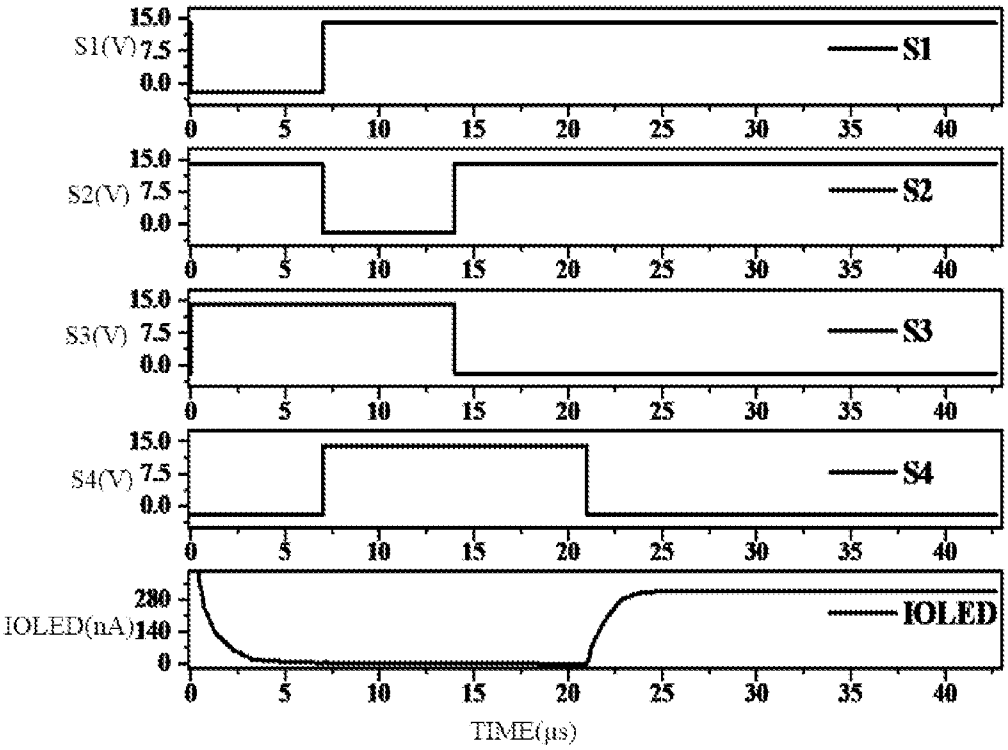
FIG. 6 is a schematic diagram of changes in light-emitting current of the pixel circuit in FIG. 1.

As shown in FIG. 6, a simulation effect simulated by a simulation program with integrated circuit emphasis (SPICE) of the pixel circuit in the above embodiments is shown. When time is about 21 μs, the grayscale modulation signal S4 changes from a high level to a low level, so a current flowing through the driving transistor T5, that is, the light-emitting current IDLED, gradually rises from 0 to a current value corresponding to the potential VDATA of the data signal. It can be observed that a rise time of the light-emitting current IDLED is about 3 μs, which is mainly because the capacitor corresponding to the light-emitting device D1 in the pixel circuit needs a certain charging time.

Figure 7:
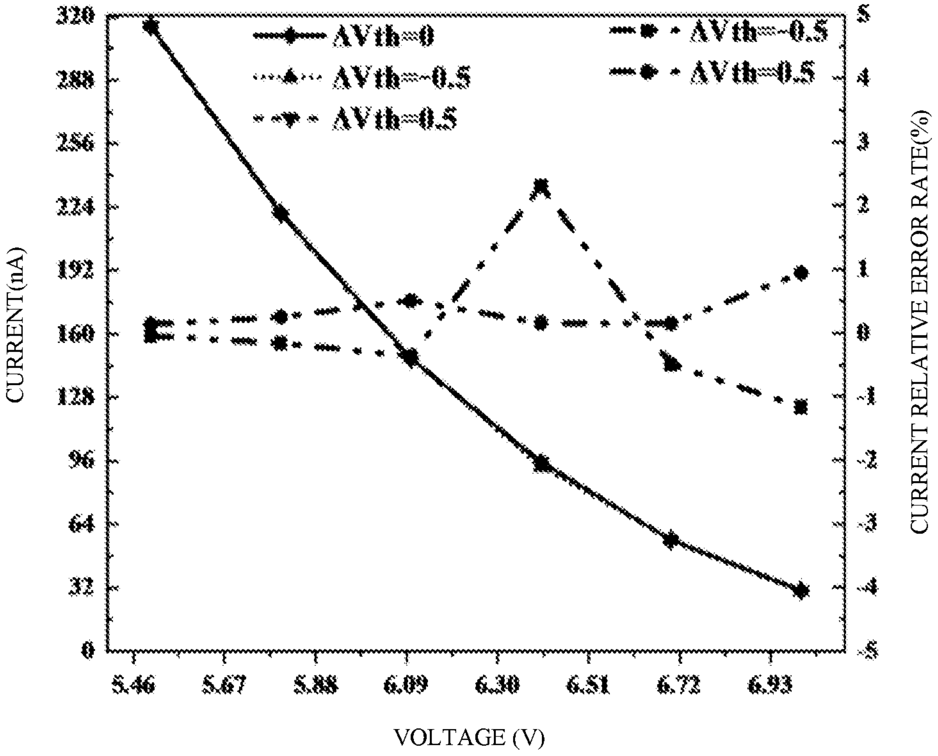
FIG. 7 is a schematic diagram of a relationship between a threshold voltage shift of a driving transistor and the light-emitting current in the pixel circuit shown in FIG. 1.

As shown in FIG. 7, the SPICE simulation of the change of the light-emitting current IDLED when the threshold voltage of the driving transistor T5 is shifted by 0.5V in the pixel circuit in the above-mentioned embodiments is shown. The simulation set a range of the light-emitting current IDLED between 30 nA-300 nA. When the threshold voltage of the driving transistor T5 shifts ±0.5V, an absolute value of a relative change rate of the light-emitting current IDLED does not exceed 3%, and in most cases it does not exceed 0.8%. Due to a certain error existed between the SPICE model used in the simulation and a device prepared by an actual process, the simulation result may be different from an actual one. However, this simulation result can also show to a certain extent that the pixel circuit provided in the above embodiments can basically meet requirements of high-resolution display.

Figure 8:
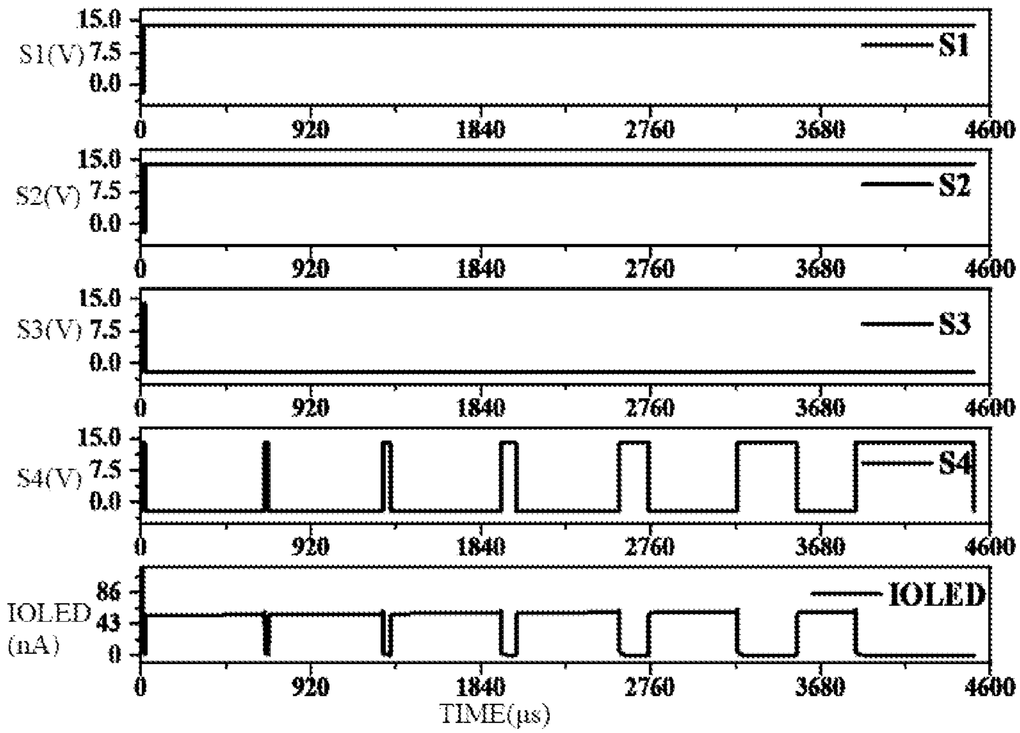
FIG. 8 is a schematic diagram of changes of the light-emitting current of the pixel circuit in FIG. 1 operating in the pulse width modulation phase.

As shown in FIG. 8, the SPICE simulation of the light-emitting current IDLED when the pixel circuit in the above-mentioned embodiments is in the PWM operating mode is shown. The PWM mode is generally used under low gray-scale brightness. The simulation simulates a PWM operating mode with the light-emitting current IDLED around 50 nA. In this working mode, after an initial reset and programming of the pixel circuit are completed, the initialization control signal S1, the writing control signal S2, and the first light-emitting control signal S3 remain unchanged, and only the gray-scale modulation signal S4 modulates the light-emitting time of the light-emitting device D1. The simulation here only verifies that the gray-scale modulation signal S4 is under PWM modulation, and the light-emitting device D1 has a function of PWM brightness output.

In one of the embodiments, this embodiment provides a display panel comprising the pixel circuit in any of the above embodiments.

It can be understood that, in the display panel provided in this embodiment, the control terminal of the first light-emitting control unit 10 and the control terminal of the compensation unit 30 share the second wire, which can save the wire quantity of the pixel circuit, thereby improving the display resolution. At the same time, the control terminal of the driving unit 20 is only equipped with the compensation unit 30, which reduces the leakage path of the control terminal of the driving unit 20, and can reduce the leakage current of the control terminal of the driving unit 20.

Alternatively, in the display panel provided by this embodiment, the gate of the first light-emitting control transistor T4 and the gate of the compensation transistor T2 share the second wire, which can save the wire quantity of the pixel circuit, thereby improving the display resolution. At the same time, the gate of the driving transistor T5 is only equipped with the compensation transistor T2, which reduces the leakage path of the gate of the driving transistor T5 and can reduce the leakage current of the gate of the driving transistor T5.

Wherein, the second wire can be used to transmit the first light-emitting control signal S3 or the first light-emitting control signal S4. The third wire can be used to transmit the gray-scale modulation signal S3 or the gray-scale modulation signal S4.

Figure 9:
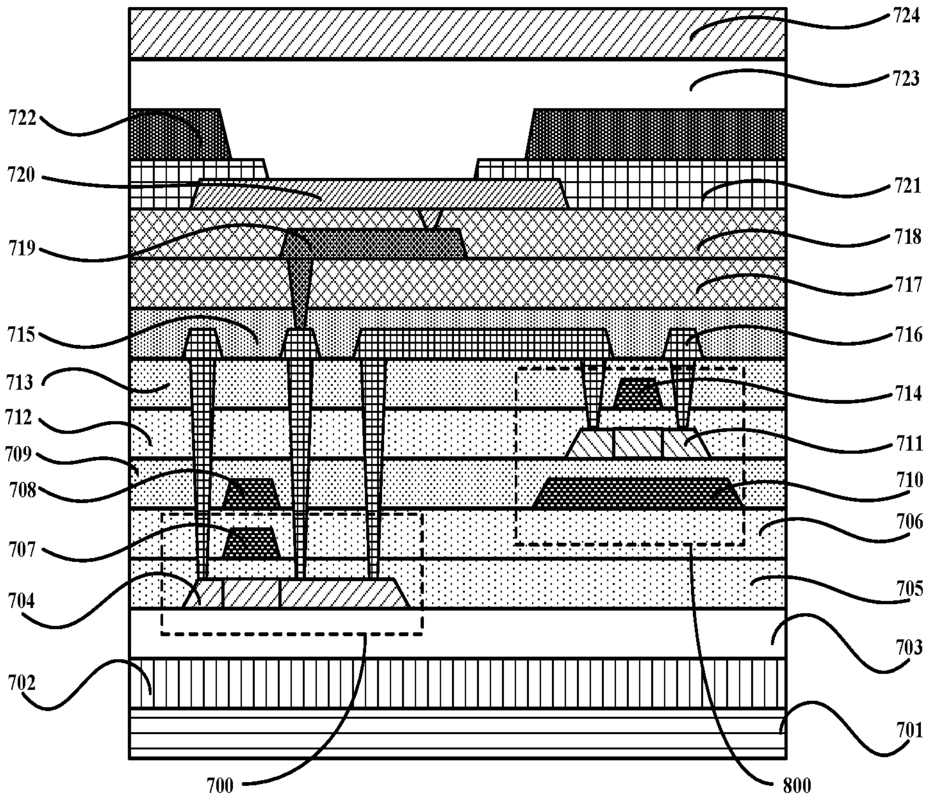
FIG. 9 is a schematic structural diagram of a display panel provided by an embodiment of the present disclosure.

As shown in FIG. 9, in one of the embodiments, the display panel may comprise a double PI layer 701, an isolation layer 702, a buffer layer 703, a polysilicon layer 704, a first gate insulating layer 705, and a second gate insulating layer 706, a first metal layer 707, a second metal layer, a first interlayer dielectric layer 709, an IGZO active layer 711, a third gate insulating layer 712, a second interlayer dielectric layer 713, a third metal layer 714, a passivation layer 715, a first source-drain metal layer 716, a first planarization layer 717, a second planarization layer 718, a second source-drain metal layer 719, an anode 720, a pixel defining layer 721, a support layer 722, a light-emitting layer 723, and a cathode 724. Wherein, the second metal layer may comprise a first metal block 708 and a second metal block 710.

Wherein, the driving transistor T5 may comprise the polysilicon layer 704, the first gate insulating layer 705, the first metal layer 707, and the first source-drain metal layer 716, so that a polysilicon device 700 may be formed.

The compensation transistor T2 may comprise the first interlayer dielectric layer 709, the IGZO active layer 711, the third gate insulating layer 712, the second interlayer dielectric layer 713, the third metal layer 714, and the first source-drain metal layer 716.

In one of the embodiments, the compensation transistor T2 may further comprise a second metal layer 710, so that a dual-gate IGZO device 800 may be formed. Wherein, the second metal layer 710 and the third metal layer 714 are two gates of the dual-gate IGZO device 800, respectively. The first metal layer 707, the first metal block 708, the first source-drain metal layer 716, and the second source-drain metal layer 719 are located in different film layers, and can be used to fabricate a metal-insulator-metal (MIM) capacitor.

It can be understood that, for those of ordinary skilled in the art, equivalent replacements or changes can be made according to technical solutions of the present disclosure and the inventive concept, and all these changes or replacements shall fall within the protection scope of the appended claims of the present disclosure.

What is claimed is:

1. A pixel circuit comprising:

a first wire;

a first light-emitting control unit, wherein a control terminal of the first light-emitting control unit is electrically connected to the first wire;

a driving unit, wherein one terminal of the driving unit is electrically connected to one terminal of the first light-emitting control unit;

a compensation unit, wherein one terminal of the compensation unit is electrically connected to the driving unit, another terminal of the compensation unit is electrically connected to a control terminal of the driving unit, and a control terminal of the compensation unit is electrically connected to the first wire;

a second wire;

a third wire;

a fourth wire;

a fifth wire;

a second light-emitting control unit, wherein one terminal of the second light-emitting control unit is directly connected to the second wire, another terminal of the second light-emitting control unit is directly connected to another terminal of the driving unit, and a control terminal of the second light-emitting control unit is directly connected to the third wire; and an initialization unit, wherein a control terminal of the initialization unit is electrically connected to the fifth wire, one terminal of the initialization unit is electrically connected to the fourth wire, and another terminal of the initialization unit is directly connected to any one of one terminal of the first light-emitting control unit, another terminal of the first light-emitting control unit, or the control terminal of the driving unit;

wherein, in an initialization phase of the pixel circuit, at least one of the compensation unit, the first light-emitting control unit, and or the initialization unit is in an on state.

2. The pixel circuit according to claim 1, wherein a switching element used in the compensation unit is an N-channel type oxide thin film transistor; and a switching element used in the first light-emitting control unit is a P-channel type thin film transistor.

3. The pixel circuit according to claim 2, wherein the switching element used in the first light-emitting control unit is a polysilicon thin film transistor; and a switching element used in the driving unit is a polysilicon thin film transistor.

4. The pixel circuit according to claim 1, wherein the third wire is configured to transmit a gray-scale modulation signal.

5. The pixel circuit according to claim 1, wherein the pixel circuit further comprises:

a sixth wire;

a seventh wire;

an eighth wire;

a light-emitting unit, wherein one terminal of the light-emitting unit is electrically connected to the another terminal of the first light-emitting control unit, and another terminal of the light-emitting unit is electrically connected to the sixth wire; and a writing unit, wherein one terminal of the writing unit is electrically connected to the seventh wire, a control terminal of the writing unit is electrically connected to the eighth wire, and another terminal of the writing unit is electrically connected to the driving unit.

6. A pixel circuit, comprising:

a first wire;

a first light-emitting control transistor, wherein a gate of the first light-emitting control transistor is electrically connected to the first wire;

a driving transistor, wherein one of a source or a drain of the driving transistor is electrically connected to one of a source or a drain of the first light-emitting control transistor;

a compensation transistor, one of a source or a drain of the compensation transistor is electrically connected to the driving transistor, and another one of the source or the drain of the compensation transistor is electrically connected to a gate of the driving transistor, and a gate of the compensation transistor is electrically connected to the first wire;

a second wire;

a third wire;

a fourth wire;

a fifth wire;

a second light-emitting control transistor, wherein one of a source or a drain of the second light-emitting control transistor is directly connected to the second wire, and another one of the source or the drain of the second light-emitting control transistor is directly connected to another one of the source or the drain of the driving transistor, and a gate of the second light-emitting control transistor is directly connected to the third wire; and an initialization transistor, wherein a gate of the initialization transistor is electrically connected to the fifth wire, one of a source or a drain of the initialization transistor is electrically connected to the fourth wire, and another one of the source or the drain of the initialization transistor is directly connected to any one of one of the source or the drain of the first light-emitting control transistor, another one of the source or the drain of the first light-emitting control transistor, or the gate of the driving transistor;

wherein, in an initialization phase of the pixel circuit, at least one of the compensation transistor, the second light-emitting control transistor, or the initialization transistor is in an on state.

7. The pixel circuit according to claim 6, wherein the compensation transistor is an N-channel type oxide thin film transistor; and the first light-emitting control transistor is a P-channel type thin film transistor.

8. The pixel circuit according to claim 7, wherein the first light-emitting control transistor is a polysilicon thin film transistor; and the driving transistor is a polysilicon thin film transistor.

9. The pixel circuit according to claim 6, wherein the third wire is configured to transmit a gray-scale modulation signal.

10. The pixel circuit according to claim 6, wherein the pixel circuit further comprises:

a sixth wire;

a seventh wire;

an eighth wire;

a light-emitting device, an anode of the light-emitting device is electrically connected to another one of the source or the drain of the first light-emitting control transistor, and a cathode of the light-emitting device is electrically connected to the sixth wire; and a writing transistor, one of a source or a drain of the writing transistor is electrically connected to the seventh wire, a gate of the writing transistor is electrically connected to the eighth wire, and another one of the source or the drain of the writing transistor is electrically connected to one of the source or the drain of the driving transistor.

11. A display panel, comprising a pixel circuit, wherein the pixel circuit comprises:

a first wire;

a first light-emitting control unit, wherein a control terminal of the first light-emitting control unit is electrically connected to the first wire;

a driving unit, wherein one terminal of the driving unit is electrically connected to one terminal of the first light-emitting control unit;

a compensation unit, wherein one terminal of the compensation unit is electrically connected to the driving unit, another terminal of the compensation unit is electrically connected to a control terminal of the driving unit, and a control terminal of the compensation unit is electrically connected to the first wire;

a second wire;

a third wire;

a fourth wire;

a fifth wire;

a second light-emitting control unit, wherein one terminal of the second light-emitting control unit is directly connected to the second wire, another terminal of the second light-emitting control unit is directly connected to another terminal of the driving unit, and a control terminal of the second light-emitting control unit is directly connected to the third wire;

an initialization unit, wherein a control terminal of the initialization unit is electrically connected to the fifth wire, one terminal of the initialization unit is electrically connected to the fourth wire, and another terminal of the initialization unit is directly connected to any one of one terminal of the first light-emitting control unit, another terminal of the first light-emitting control unit, or the control terminal of the driving unit; and a storage unit, one terminal of the storage unit is electrically connected to the control terminal of the driving unit;

wherein, in an initialization phase of the pixel circuit, at least one of the compensation unit, the first light-emitting control unit, and or the initialization unit is in an on state.

12. The display panel according to claim 11, wherein a switching element used in the compensation unit is an N-channel type oxide thin film transistor; and a switching element used in the first light-emitting control unit is a P-channel type thin film transistor.

13. The display panel of claim 12, wherein the switching element used in the first light-emitting control unit is a polysilicon thin film transistor; and a switching element used in the driving unit is a polysilicon thin film transistor.

* * * * *